United States Patent [19]

Shimada

[11] Patent Number: 4,796,095

[45] Date of Patent: Jan. 3, 1989

[54] METHOD OF GENERATING IMAGE SCANNING CLOCK SIGNALS IN OPTICAL SCANNING APPARATUS

[75] Inventor: Kazuyuki Shimada, Chofu, Japan

[73] Assignee: Rioch Company, Limited, Tokyo, Japan

[21] Appl. No.: 99,539

[22] Filed: Sep. 22, 1987

[30] Foreign Application Priority Data

Sep. 9, 1986 [JP] Japan ................................. 61-226641

[51] Int. Cl.$^4$ ............................................. H04N 1/04
[52] U.S. Cl. ................................... 358/285; 358/264; 377/76; 328/55; 328/63
[58] Field of Search ..................... 377/76; 328/55, 62, 328/63; 358/148, 264, 265, 285

[56] References Cited

U.S. PATENT DOCUMENTS

| | | | |
|---|---|---|---|
| 4,000,368 | 12/1976 | Tisue | 358/264 |
| 4,268,867 | 5/1981 | Traino | 358/285 |
| 4,443,765 | 4/1984 | Findeisen | 377/76 |
| 4,638,497 | 1/1987 | Kumatsu et al. | 358/264 |
| 4,713,621 | 12/1987 | Nakamura et al. | 328/63 |

Primary Examiner—John S. Heyman
Attorney, Agent, or Firm—Cooper & Dunham

[57] ABSTRACT

Reference clock signals of the same frequency as that of image scanning clock signals are applied to a shift register, and corrective clock signals of a higher frequency than that of the reference clock signals $C_0$ are applied as shift clock signals to the shift register, which generates n output signals $C_1, C_2, \ldots C_n$ ($n \geq 2$) which are applied to delay circuits. The delay circuits produce pulse signal groups which are successively delayed $\Delta t$ in phase. Assuming that the frequency of the reference clock signals is $f_0$ MHz and the frequency of the corrective clock signals is $n \cdot f_0$ MHz, the above phase $\Delta t$ is selected to meet meets the relationship:

$$0 < \Delta t < \frac{1}{n \cdot f_0}$$

One of the pulse signal groups thus delayed $\Delta t$ in phase is selected as image scannnig clock signals in response to an output signal from a light sensor that detects a scanning beam for synchronizing main scanning cycles.

2 Claims, 4 Drawing Sheets

METHOD OF GENERATING IMAGE SCANNING CLOCK SIGNALS IN OPTICAL SCANNING APPARATUS

BACKGROUND OF THE INVENTION

The present invention relates to a method of generating image scanning clock signals in an optical scanning apparatus.

There are known optical scanning apparatus in which a light beam is periodically deflected by a rotating light beam deflector such as a rotating polygonal mirror or a hologram grating disk for reading or writing information.

The light beam, such as a laser beam, is deflected by the rotating light beam deflector into a scanning beam which is focused as a spot on and scans a surface through a suitable optical system. The surface being scanned may be an original having information if such information is to be read, or may be a photoconductive photosensitive body when information is to be written. While the scanning beam is scanning the surface, the information is read or written at the rate of one pixel per one clock pulse in response to image scanning clock signals.

The scanning of an object surface with a scanning beam is known as "main scanning". During main scanning, the object surface is fed in a direction normal to the direction in which the main scanning occurs. The feeding of the object surface is called as "auxiliary scanning".

In order to read and write information properly, it is necessary to align main scanning starting points in the direction of the auxiliary scanning. If the main scanning starting points were not aligned in the auxiliary scanning direction, then an image reproduced from read-out signals would be distorted or an image written by the scanning beam would be subjected to distortion called "jitter".

It has been general practice to align main scanning starting points in the auxiliary scanning direction by providing a light sensor outside of a main scanning region near the main scanning starting points and detecting the scanning beam just before each main scanning cycle so as to synchronize the main scanning cycles (see, for example, Japanese Laid-Open Patent Publication No. 61-175611).

One way of synchronizing the main scanning cycles is to use image scanning clock signals. According to this process, the instant the light sensor detects the scanning beam, image scanning clock pulses start being counted by m, and a main scanning cycle is started when (m+1) pulses are counted. The image scanning clock signals are successively generated. Since the interval between output signals from the light sensor, which serve as a reference for synchronization of main scanning cycles, varies due for example to the mechanical accuracy of the rotating light beam deflector, the time interval from detection by the light sensor of the scanning beam to the starting of a main scanning cycle varies up to one clock pulse at maximum dependent on whether the light sensor output signals are generated upon high or low levels of the clock signals, resulting in scanning irregularities.

Variations in the time interval from detection by the light sensor of the scanning beam to the starting of a main scanning cycle up to one clock pulse at maximum, mean that the positions of the main scanning starting points vary up to one pixel. There is a method for reducing the maximum positional variation of the main scanning points to 1/N pixel (N is a natural number), and this method is called a 1/N method for convenience.

According to the 1/N method, n pulse signals $C_1$ through $C_n$ are produced by a shift register from reference clock signals of the same frequency as that of image scanning clock signals, the pulse signals $C_1$ through $C_n$ being successively shifted in phase by a constant phase difference such that the phase difference between the pulse signals $C_1$ and $C_n$ are smaller than one period of the image scanning clock signals, and one of the pulse signals $C_1$ through $C_n$ is selected as an image scanning clock signal. With this method, poiitional variations of the main scanning starting points are below 1/N at maximum where N=n−1.

The conventional 1/N method has a problem in that corrective clock signals of an extremely high frequency are required as shift clock signals for the shift register. For example, if the frequency of reference clock signals, i.e., image scanning clock signals is 10 MHz with N=20, then the frequency of corrective clock signals should be 200 MHz. Therefore, the cost of a clock generator for generating such corrective clock signals is high, and so is the optical scanning apparatus.

SUMMARY OF THE INVENTION

In view of the aforesaid problems of the conventional method of generating image scanning clock signals, it is an object of the present invention to provide a method of generating image scanning clock signals without requiring corrective clock signals for a shift register to have an extremely high frequency, the method being capable of sufficiently reducing positional variations of image scanning starting points.

The method of generating image scanning clock signals according to the present invention can be carried out by an optical scanning apparatus in which a light beam is deflected by a rotating light beam deflector such as a rotating polygonal mirror or a hologram grating disk to scan a surface area, and the light beam is detected by a light sensor disposed outside of the surface area being scanned for synchronizing main scanning cycles.

One of a plurality of pulse signal groups which are of the same frequency as that of image scanning clock signals and are shifted in phase from each other is selected as image scanning clock signals by an output signal from the light sensor.

Reference clock signals $C_0$ of the same frequency as that of the image scanning clock signals are applied to a shift register. Corrective clock signals SCK of a higher frequency than that of the reference clock signals $C_0$ are applied as shift clock signals to the shift register.

The shift register generates n output signals $C_1, C_2, \ldots C_n$ ($n \geq 2$) which are successively delayed a phase $\Delta t$ by delay circuits to produce the aforesaid plurality of pulse signal groups.

Assuming that $C_0$ is $f_0$ MHz and SCK is $n \cdot f_0$ MHz (n is an integer of 2 or greater), the above phase $\Delta t$ meets the relationship:

$$0 < \Delta t < \frac{1}{n \cdot f_0}$$

With the method of the present invention, the reference clock signals are accurately successively shifted a certain phase by the shift register and then shifted $\Delta t$ by the delay circuits. Therefore, the shift clock signals for the shift register are not required to be of an extremely high frequency, and positional variations of main scanning starting points are reduced. For example, where the frequency of image scanning clock signals is 10 MHz to make positional variations of the main scanning starting points smaller than 1/10 pixel, the frequency of shift clock signals may be lower than 100 MHz.

The above and other objects, features and advantages of the present invention will become more apparent from the following description when taken in conjunction with the accompanying drawings in which a preferred embodiment of the present invention is shown by way of illustrative example.

DESCRIPTION OF THE REFERRED EMBODIMENT

Figure 1:
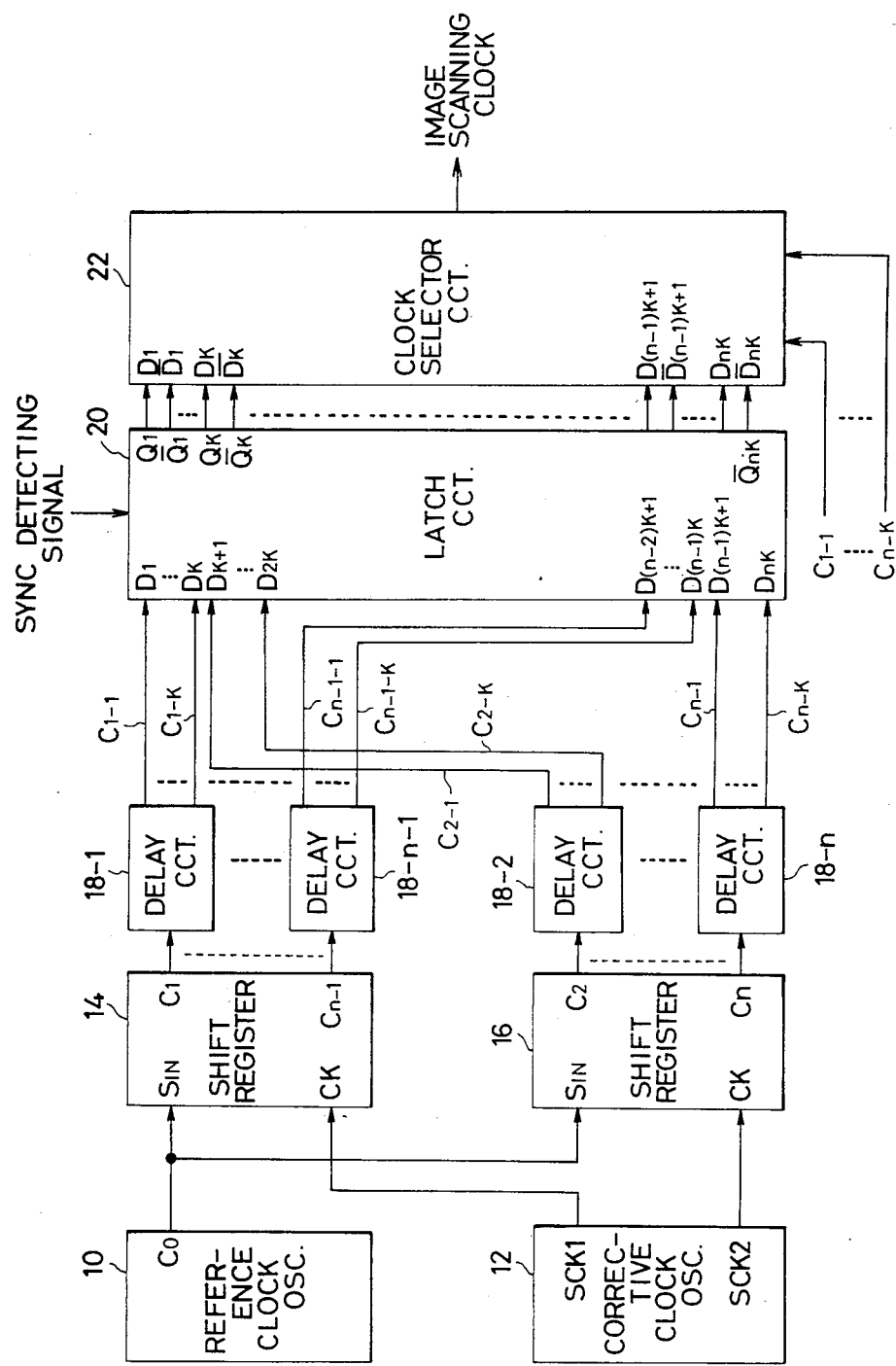
FIG. 1 is a block diagram of a circuit arrangement for carrying out a method according to the present invention.

As shown in FIG. 1, reference clock signals $C_0$ are generated by a reference clock oscillator 10 and applied to shift registers 14, 16. The reference clock signals $C_0$ are of the same frequency as that of image scanning clock signals, i.e., $f_0$ MHz. A corrective clock oscillator 12 generates corrective clock signals SCK1, SCK2, which are of the frequency $n \cdot f_0$ MHz. If a synchronism accuracy of $1/N$ is desired, then $n = N/2$, and the corrective clock signals SCK1, SCK2 are shifted $\pi$ in phase from each other.

The shift register 14 is supplied with the corrective clock signals SCK1 as shift clocks and produce output signals $C_1, C_3, \ldots C_{n-1}$ which are generated by shifting the reference clock signals $C_0$ in phase by one clock signal of the corrective clock signals SCK1. The shift register 16 is supplied with the corrective clock signals SCK2 as shift clocks and produce output signals $C_2, C_4, C_6, \ldots, C_n$ which are generated by shifting the reference clock signals $C_0$ in phase by one clock signal of the corrective clock signals SCK2. Thus, n pulse signals $C_1$ through $C_n$ are produced which are of the same frequency $f_0$ as that of the reference clock signals and shifted in phase by one clock signal of the corrective clock signals SCK1, with n being an even number. If n is an odd number, the shift register 14 generates output signals $C_1, C_3, C_5, \ldots C_n$, and the shift register 14 generates output signals $C_2, C_4, \ldots C_{n-1}$. Hereinafter, n is regarded as an even number.

Figure 2:
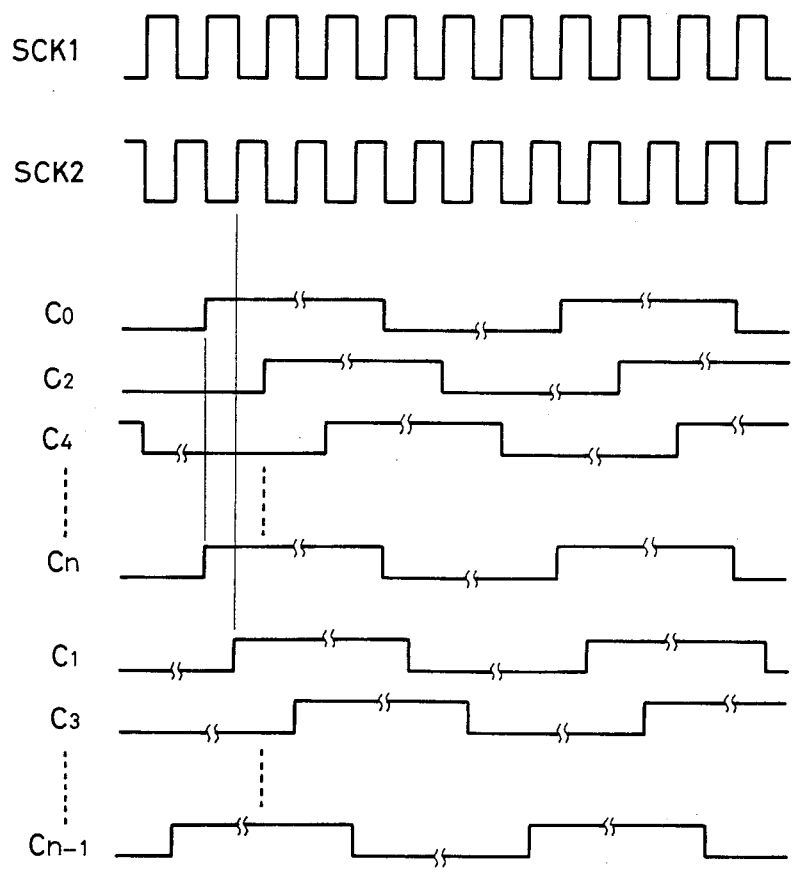
FIGS. 2 through 4 are timing charts explaining the method of the invention.

The corrective clock pulses SCK1, SCK2 and the pulse signals $C_1$ through $C_n$ are shown in FIG. 2. FIG. 2 clearly indicates that the output signals $C_1$ through $C_n$ from the shift registers 14, 16 are shifted in phase by $1/n$ dot with accuracy.

In FIG. 1, the output signals from the shift register 14 are applied respectively to $n/2$ delay circuits $18-1$, $18-3$, $18-5$, ... $18-n-1$ in one-to-one correspondence, and the output signals from the shift register 16 are applied respectively to $n/2$ delay circuits $18-2$, $18-4$, ... $18-n$ in one-to-one correspondence.

The delay circuits $18-i$ ($i=1$ through n) generate k ($k \geq 2$) pulse signals $C_{i-j}$ $J=1$ through k which are shifted $\Delta t$ in phase from the applied pulse signals $C_i$ ($i=1$ through n).

Figure 3:
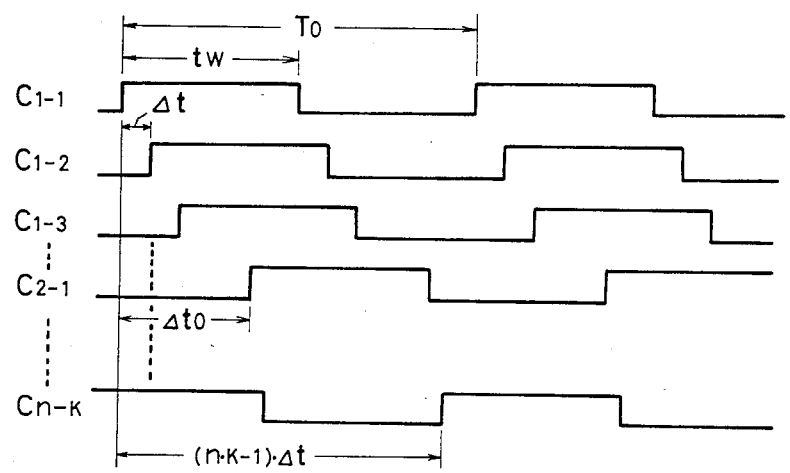

In this manner, $n \times k$ pulse signal groups $C_{1-1}, C_{1-2}, \ldots C_{1-k}, C_{2-k}, \ldots C_{n-1}, \ldots C_{n-k}$ are obtained. These signal groups are mutually shifted $\Delta t$ in phase FIG. 3 shows these pulse signal groups. Denoted at $\Delta t_0$ in FIG. 3 is the one-clock-signal interval of the corrective clock signals SCK. Naturally, $0 < \Delta t < (1/n \cdot f_0)$.

As illustrated in FIG. 1, the $n \cdot k$ pulse signal groups $C_{1-1}, C_{1-2}, \ldots C_{n-k}$ are applied to a latch circuit 20 which is also supplied with a synchronism detecting signal. In response to a leading edge of the synchronism detecting signal, the latch circuit 20 latches the $n \cdot k$ input signals $C_{1-1}, C_{1-2}, \ldots C_{n-k}$ and produces $2nk$ output signals $Q_1, \overline{Q}_1, Q_2, \overline{Q}_2, \ldots Q_k, \overline{Q}_k, \ldots Q_{nk}, \overline{Q}_{nk}$. The synchronism detecting signal is produced by a light sensor disposed outside of a main scanning region near main scanning starting points when the light sensor detects a scanning beam.

The output signals $Q_i$ ($i=1$ through $n \cdot k$) and $\overline{Q}_i$ ($i=1$ through k) corresspond respectively to the latched pulse signals $C_{i-j}$ ($i=1$ through n, $j=1$ through k) When the corresponding pulse signals are high, $Q_i = 1$ and $\overline{Q}_i = 0$, and when the corresponding pulse signals are low, $Q_i = 0$ and $\overline{Q}_i = 1$.

The $2nk$ output signals $Q_i, \overline{Q}_i$ ($i=1$ through n k) are applied to a clock selector circuit 22, to which there are also applied the pulse signal groups $C_{l-1}$ through $C_{n-k}$. In response to the input signals $C_{l-1}$ through $C_{n-k}$, $Q_1$ through $Q_{nk}$, and $Q_1$ through $Q_{nk}$, the clock selector circuit 22 selects one of the pulse signal groups $C_{l-1}$ through $C_{n-k}$ and issues the selected pulse signal group as image scanning clock signals.

The image scanning clock signals are counted by a counter (not shown). When a prescribed number of clock pulses are counted, a main scanning cycle for scanning a surface with a scanning beam is started.

Figure 4:
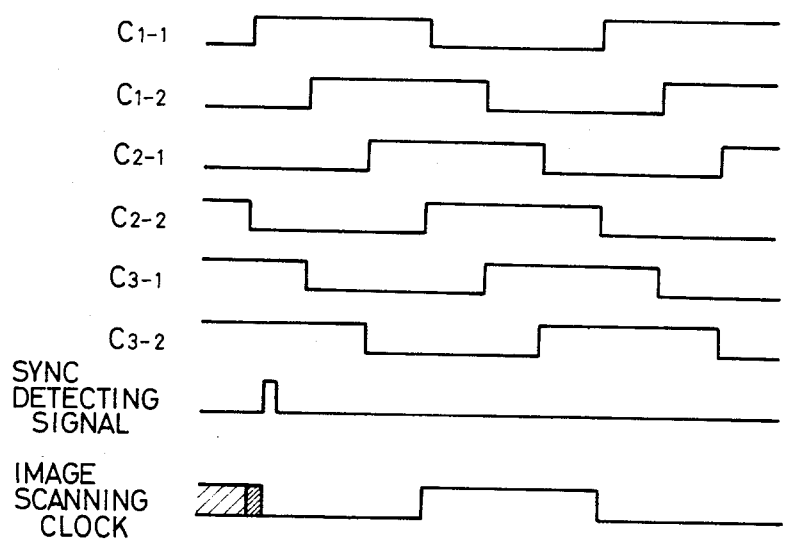

An example where $n=3$, $k=2$, i.e., $n \cdot k = 6$ will be described below. FIG. 4 is a timing chart where $C_{2-2}$ is selected from six pulse signal groups as image scanning clock signals.

With pulse signal groups $C_{l-1}$ through $C_{3-2}$ and the synchronism detecting signal being of the relationship as shown in FIG. 4, the pulse signal groups $C_{1-1}, C_{3-1}, C_{3-2}$ as latched by the latch circuit 20 in response to the leading edge of the synchronism detecting signal are high and the pulse signal groups $C_{1-2}, C_{2-1}, C_{2-2}$ as latched by the latch circuit 20 in response to the leading edge of the synchronism detecting signal are low.

At this time, the output signals $Q_1, \overline{Q}_1$ of the latch circuit 12 correspond to $C_{1-1}$, the output signals $Q_2, \overline{Q}_2$ to $C_{1-2}$, the output signals $Q_3, \overline{Q}_3$ to $C_{2-1}$, the output signals $Q_4, \overline{Q}_4$ to $C_{2-2}$, the output signals $Q_5, \overline{Q}_5$ to $C_{3-1}$, and the output signals $Q_6, \overline{Q}_6$ to $C_{3-2}$. According to the above levels of the pulse signal groups $C_{1-1}$ through $C_{3-2}$, the latch circuit 20 produces output signals $Q_1=1, \overline{Q}_1=0, Q_2=0, \overline{Q}_2=1, Q_3=0, \overline{Q}_3=1, Q_4=0, \overline{Q}_4=1, Q_5=1, \overline{Q}_5=0, Q_6=1, \overline{Q}_6=0$.

The clock selector circuit 22 obtains $Q_i \overline{Q}_{i+1}$ or $Q_i \overline{Q}_{i+1}$ from $Q_i, \overline{Q}_i$. When $i=6, i+1=1$. For $Q_i \overline{Q}_{i+1}$, the output signals are as follows:

TABLE

| i | Qi | $\overline{Q}_i$ | Qi $\overline{Q}$ + 1 |
|---|----|------------------|------------------------|
| 1 | 1  | 0                | 1                      |
| 2 | 0  | 1                | 0                      |
| 3 | 0  | 1                | 0                      |
| 4 | 0  | 1                | 0                      |

TABLE-continued

| i | Qi | Q̄i | Qi Q̄i+1 |
|---|----|----|---------|
| 5 | 1  | 0  | 0       |
| 6 | 1  | 0  | 0       |

As is apparent from the above table, the value of $Q_i \bar{Q}_{i+1}$ is $i=1$ only when $i=1$ and is 0 when i is of the other values. This indicates that the leading edge of the synchronism detecting signal is present during the time interval $\Delta t$ from the time when the pulse signals $C_{1-1}$ become high to the time when the pulse signals $C_{1-2}$ become high, as can readily be understood from FIG. 4.

Generally, jth pulse signals (j=3 in FIG. 4) as counted from i (i=1 in FIG. 4) which makes $Q_i \bar{Q}_{i+1}$ equal to 1 are selected as image scanning clock signals. j is a design parameter which can appropriately be selected.

Figure 5:
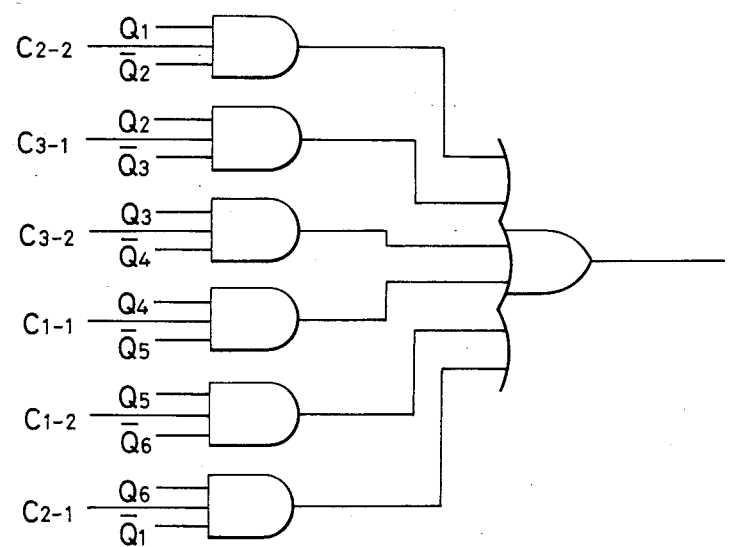
FIG. 5 is a block diagram of a clock selector circuit in the circuit arrangement shown in FIG. 1.

A clock selector circuit for selecting third pulse signals (j =3) as counted from i which makes $Q_i Q_{i+1}$ equal to 1 can be realized by a combination of AND gates and an OR gate as shown in FIG. 5.

The condition immediately before the image scanning clock signals are selected by the sychronism detecting signal is undefined in FIG. 4. Stated otherwise, switching from the image scanning clock signals before selection is made by the synchronism detecting signal to the presently selected image scanning clock signals is effected.

Where, after the image scanning clock signals are selected b the sychronism detecting signal and the line is scanned, image scanning clock signals are to be inhibited subsequently to the generation of a certain number of clock pulses, the condition immediately before image scanning clock signals are selected is a certain defined condition.

By establishing the inter-tap delay time $\Delta t$ between the delay circuits in the manner proposed by the inventor in Japanese Patent ppplication No. 60-44179, the accuracy of image scanning clock signals may be made higher.

More specifically, assuming that the number of taps of the delay circuits, i.e., the number of pulse signals generated by the delay circuits is k, as described, an inter-tap delay error is $\pm\alpha\%$, a maximum error between the main scanning starting points is 1/N pixel, and the period of the image scanning clock signals is $T_0$ (see FIG. 3), $\Delta t$ is established to meet the following relationships: (A) where $$2 \leq k \leq \frac{3 + \frac{100}{\alpha}}{2}$$

when $(i) \frac{100 + \alpha}{100 k - (k-2)\alpha} \leq \frac{1}{N} < \frac{1}{k-1}$, $$\frac{1 - 1/N}{(k-1)\left(1 - \frac{\alpha}{100}\right)} T_0 \leq \Delta t \leq \frac{1/N}{1 + \frac{\alpha}{100}} \cdot T_0$$

when $(ii) \frac{1}{k-1} \leq \frac{1}{N} < 1$, $$\frac{1 - 1/N}{(k-1)\left(1 - \frac{\alpha}{100}\right)} T_0 \leq \Delta t < \frac{1}{(k-1)\left(1 + \frac{\alpha}{100}\right)} \cdot T_0$$

(B0 where $$\frac{3 + \frac{100}{\alpha}}{2} < n$$

when $\frac{2\alpha}{100 + \alpha} \geq \frac{1}{N} < 1$, $$\frac{1 - 1/N}{(k-1)\left(1 - \frac{\alpha}{100}\right)} T_0 \leq \Delta t < \frac{1}{(k-1)\left(1 + \frac{\alpha}{100}\right)} \cdot T_0$$

Although a certain preferred embodiment has been shown and described, it should be understood that many changes and modifications may be made therein without departing from the scope of the appended claims.

What is claimed is:

1. A method of generating image scanning clock signals in an optical scanning apparatus in which a light beam is periodically deflected by a rotating light beam deflector to scan a surface area, and is detected by a light sensor disposed outside of the surface area being scanned for synchronizing main scanning cycles, said method comprising the steps of:
   selecting one of a plurality of pulse signal groups which are of the same frequency as that of image scanning clock signals and are shifted in phase from each other, as image scanning clock signals in response to an output signal from the light sensor;
   applying reference clock signals $C_0$ of the same frequency as that of the image scanning clock signals to a shift register;
   applying corrective clock signals SCK of a higher frequency than that of the reference clock signals $C_0$ as shift clock signals to the shift register; and
   delaying n output signals $C_1, C_2, C_3, \ldots C_n$ ($n \geq 2$) from said shift register successively a phase $\Delta t$ by delay circuits to produce the aforesaid plurality of pulse signal groups, said phase $\Delta t$ meeting the relationship:

$$0 < \Delta t < \frac{1}{n \cdot f_0}$$

where $C_0$: $f_0$ MHz, and SCK: $n \cdot f_0$ MHz

2. A method according to claim 1, wherein assuming that the number of taps of the delay circuits, i.e., the number of pulse signals generated by the delay circuits is k, an inter-tap delay error is $\pm\alpha\%$, a maximum error between main scanning starting points is 1/N pixel, and the period of the image scanning clock signals is $T_0$, the phase or inter-tap delay time $\Delta t$ is established to meet the following relationships:

(A) where $$2 \leq k \leq \frac{3 + \frac{100}{\alpha}}{2}$$

when $(i) \frac{100 + \alpha}{100 k - (k-2)\alpha} \leq \frac{1}{N} < \frac{1}{k-1}$, $$\frac{1 - 1/N}{(k-1)\left(1 - \frac{\alpha}{100}\right)} \cdot T_0 \leq \Delta t \leq \frac{1/N}{1 + \frac{\alpha}{100}} \cdot T_0$$

when $(ii) \frac{1}{k-1} \leq \frac{1}{N} < 1$,

-continued
$$\frac{1-1/N}{(k-1)\left(1-\frac{\alpha}{100}\right)} \cdot T_0 \leq \Delta t < \frac{1}{(k-1)\left(1+\frac{\alpha}{100}\right)} \cdot T_0$$

(B) where $$\frac{3+\frac{100}{\alpha}}{2} < n$$

when $\frac{2\alpha}{100+\alpha} \geq \frac{1}{N} < 1$, $$\frac{1-1/N}{(k-1)\left(1-\frac{\alpha}{100}\right)} \cdot T_0 \leq \Delta t < \frac{1}{(k-1)\left(1+\frac{\alpha}{100}\right)} \cdot T_0$$

* * * * *